(12) United States Patent
Magar

(10) Patent No.: US 9,464,420 B2
(45) Date of Patent: Oct. 11, 2016

(54) LEAK DETECTION ON FLUSH VALVE

(76) Inventor: Hubert Magar, Schwerdorff (FR)

( * ) Notice: Subject to any disclaimer, the term of this patent is extended or adjusted under 35 U.S.C. 154(b) by 586 days.

(21) Appl. No.: 13/581,731

(22) PCT Filed: Mar. 2, 2011

(86) PCT No.: PCT/FR2011/050435
§ 371 (c)(1),
(2), (4) Date: Aug. 29, 2012

(87) PCT Pub. No.: WO2011/107711
PCT Pub. Date: Sep. 9, 2011

(65) Prior Publication Data
US 2012/0318382 A1 Dec. 20, 2012

(30) Foreign Application Priority Data

Mar. 2, 2010 (FR) ........................ 10 51475

(51) Int. Cl.
*E03D 1/32* (2006.01)
*E03D 1/00* (2006.01)
*F16K 31/28* (2006.01)
*F16K 33/00* (2006.01)

(52) U.S. Cl.
CPC . *E03D 1/32* (2013.01); *E03D 1/00* (2013.01); *F16K 31/28* (2013.01); *F16K 33/00* (2013.01); *Y10T 137/7358* (2015.04)

(58) Field of Classification Search
CPC ........... E03D 1/00; E03D 1/32; F16K 31/28; F16K 31/30; F16K 33/00; Y10T 137/7339; Y10T 137/7342; Y10T 137/7358; Y10T 137/7374; Y10T 137/7404; Y10T 137/7417; Y10T 137/742; Y10T 137/7423; Y10T 137/7439; Y10T 137/7446; Y10T 137/7475; Y10T 137/7485
USPC ....... 137/403, 404, 409, 414, 423, 427, 428, 137/429, 434, 436, 445, 448, 406, 407; 4/415, 366, 367, 395
See application file for complete search history.

(56) References Cited

U.S. PATENT DOCUMENTS

| 2,230,911 | A | * | 2/1941 | Russel | 137/416 |
| 5,715,856 | A | * | 2/1998 | Martin et al. | 137/423 |
| 6,913,035 | B2 | * | 7/2005 | Huang | E03D 1/32 137/425 |
| 2009/0083902 | A1 | * | 4/2009 | Fukuzawa | E03D 1/32 4/395 |
| 2015/0074894 | A1 | * | 3/2015 | Kim | E03D 1/308 4/395 |

FOREIGN PATENT DOCUMENTS

GB 2302394 A * 1/1997
WO 2009141518 A2 11/2009

OTHER PUBLICATIONS

International Search Report for corresponding International Application No. PCT/FR2011/050435.

* cited by examiner

*Primary Examiner* — Craig J Price
(74) *Attorney, Agent, or Firm* — Egbert Law Offices, PLLC

(57) ABSTRACT

An apparatus for detecting leaks and for shutting off the water flow has a flushing cistern having a water inlet that is controlled by main valve, a filling column connected to the flushing cistern, a fluid compartment having a float therein and an actuating mechanism. The main valve has an operating lever that is operable to close the main valve. The float is cooperative at the operating lever so as to pivot the operating lever when the flushing cistern is full of water. When the float lowers in the float compartment as the float compartment is emptied, the actuating mechanism causes the operating lever to open the water inlet so as to allow the flushing cistern to fill.

5 Claims, 5 Drawing Sheets

LEAK DETECTION ON FLUSH VALVE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a device for detecting leaks and shutting off the water inlet in toilet cisterns.

2. Description of Related Art Including Information Disclosed Under 37 CFR 1.97 and 37 CFR 1.98.

The flushing devices known at present generally include a valve feed to the body of the cistern, a piston for blocking the flow orifice situated at the base of the cistern, and control means for opening the water inlet slaved to the position of the piston. The control means usually comprise a float connected to a system of links for closing the water inlet valve when the cistern is filled, the adjustment of the depth of water in the cistern being based on the position of the float.

In normal operation flushing is triggered by a pushbutton or a handle the effect of which is to open the flow at the bottom of the cistern, after which the descent of the float in the cistern triggers the opening of the water inlet, the closure member at the bottom of the cistern then resumes its position and the cistern is filled. When the float reaches its topmost position, the water inlet, is shut off.

Over time the seal of the closure member is no longer as perfect as required and water from the cistern then flows continuously into the toilet, this type of malfunction being referred to in the remainder of the present description as a "small leak".

It also happens that the closure member is not repositioned at all after flushing, in which situation water flows continuously in large quantities, this type of malfunction being referred to in the remainder of the present description as a "large leak".

Small leaks and large leaks lead to an overconsumption of water that is very harmful in the present, context of conservation of resource. In order to avoid unnecessary costs it is therefore necessary to minimize these leaks.

In the field concerned the applicant has already offered solutions for alleviating leaks in cisterns, and the present invention represents an improvement relating notably to the device described in published application WO2009141518.

BRIEF SUMMARY OF THE INVENTION

The invention proposes a single, compact, optimised device enabling prevention of unwanted flow of water in a cistern in the event of small or large leaks.

The invention concerns a device for detecting leaks and shutting off a water inlet into a toilet flushing main cistern in which the water inlet is controlled by a main valve which is closed by an operating lever, said main valve supplying the flushing main cistern via a filling column, a float contained in a float compartment pivoting the operating lever when the main flushing cistern is full.

The device is characterized in that said float compartment is closed in its bottom part and over its entire lateral periphery so that the water contained in said float compartment can be expelled only by causing it to pass over at least one of the side walls thereof, and in that said device comprises an actuating mechanism for emptying said float compartment, said mechanism being configured to bring about the lowering of the float into said float compartment so as to open the water inlet.

The device of the invention for defecting leaks and shutting off the water inlet has many advantages:

- a single assembly is capable of alleviating the problem of both large and small leaks in cisterns,
- the float is totally or partially immersed in the float compartment, which avoids the use of complex mechanical systems, which usually lead to a loss of reliability of the device,
- resetting by overflowing is simple and reliable, in contrast to prior art devices in which the resetting mechanism often entails the risk of imperiling the whole of the leak detection device in the event of accidental jamming of the mechanism, different variants being possible tor resuming flushing in the ease of a large or small leak; it is also possible for the float valve to remain in the closing position for the duration of draining the main flushing cistern, opening occurring on the descent and closing of the flushing mechanism, thus obtaining a time-delay on opening with the advantage of reducing consumption and thereby saving water,
- the device has a low overall installation cost and in use provides large savings as much for the user as for the community by reason of the conservation of the water resource.

According to other features:

- said mechanism may comprise a maneuvering float connected to a lever or button for operating the flushing mechanism that is configured so that actuation of said lever or button brings about the lowering of said maneuvering float in said float compartment and overflowing of some of the water contained in said float compartment and releasing said, operating lever or button enables said maneuvering float to rise, which brings about lowering of the float and opening of the water inlet; such a solution enables a pipe and a piston or bellows to be dispensed with and is therefore universal; it may be used either with a bottom feed or a side feed, feeding being effected via a hose,
- said mechanism may comprise a ballast tank situated above said float configured to bring about the lowering of said float in the event of actuation of the flushing mechanism,
- the flow of water from the ballast tank may be effected outside the float compartment via a dedicated pipe,
- said dedicated pipe may be provided with a flow orifice leading to the main flushing cistern, which flow orifice is provided with a valve and enables flow of water from the ballast tank when the latter is ready to be emptied,
- the float compartment may receive water from the ballast tank when the latter is ready to be emptied, a main tube may establish communication between a high bell disposed in a high tank situated above said float compartment, with the area close to the level of the bottom of the flushing main cistern, said high tank, said high belt and said main tube being configured so that a lowering of the water level in the main tube produces a rise in the water level in the high bell, said rise in water level bringing about rising of the float; such an arrangement can enable detection of large leaks and shutting off of the water inlet in the event of a large leak, said high tank and said high bell may be configured so that a rise in the water level in the high bell brings about a flow via a siphon to a central compartment and then via a central tube to the float compartment, the ends of two tubes, namely the main tube and a second tube, may terminate in the high bell, said high tank being fed with water by means of an opening provided in the filling column, the low end of said main tube may be provided with a low bell disposed in a low tank including a calibrated flow orifice, an intermediate tank may be fastened to the float compartment and adapted to feed it with water to fill it, an intermediate tank may be fastened to the high tank and fed with water by the latter by means of an overflow tank, the actuating mechanism may include a bell positioned under the float, which bell is connected, by a pipe to the interior of a piston, which piston is moved by the actuating mechanism; such a mechanism will generally be used as a resetting mechanism after the water is shut off following a small leak or a large leak, the resetting mechanism may include a bell positioned under the float, which bell is connected by a pipe to a bellows, which bellows is actuated by a cylinder moved by the actuating lever, the actuating mechanism may include a vessel provided with a bell in which terminates a pipe connected to a bellows, which bellows is actuated by a cylinder moved by the actuating mechanism; such, a mechanism will generally be used as a resetting mechanism after the water is shut off following a small leak or a large leak.

Other features and advantages of the invention will emerge from the following description with reference to the appended drawings, which axe provided by way of nonlimiting example only.

DETAILED DESCRIPTION OF THE INVENTION

Figure 1:
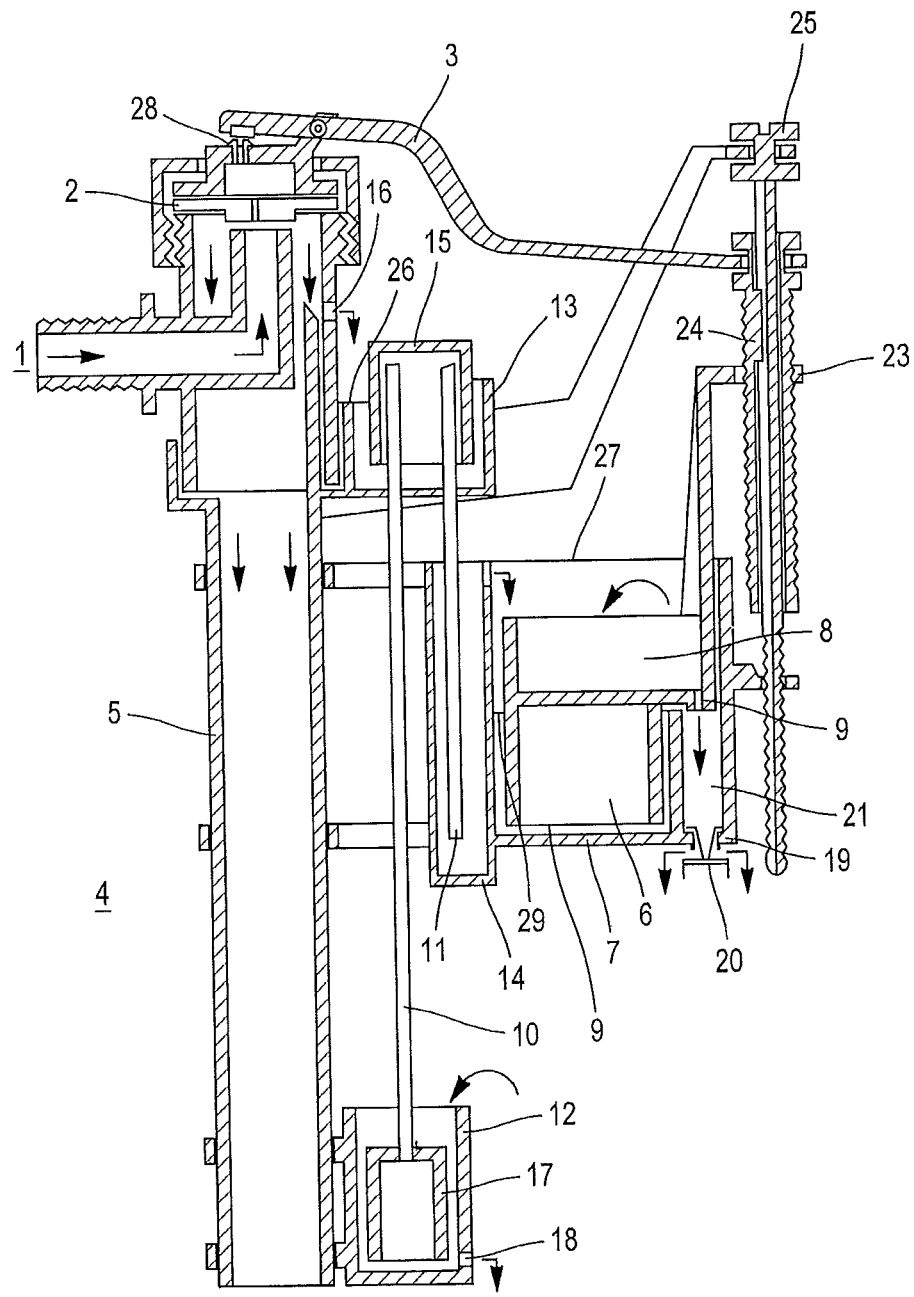
FIG. 1 is a sectional view of the device for detecting leaks and shutting off the water inlet in a first embodiment.

In an advantageous embodiment of the invention shown in figure I the device for detecting leaks and shutting off the water inlet 1 is installed in a toilet, flushing main cistern 4 and connected to the circuit for topping if up with water.

The water inlet 1 is controlled by a main valve 2 which is closed by an operating lever 3, which main valve 2 feeds the flushing main cistern 4 via a filling column 5. When the flushing main cistern 4 is filed a float 6 contained in a float compartment 7 pivots the operating lever 3 relative to its position when said main cistern 4 is empty.

In this embodiment of the invention upper portion of the float 6 is provided with a ballast tank 8. Said tank includes at its base a calibrated flow orifice 9 enabling it to be drained completely. Said float 6 is always partially or completely immersed in the float compartment 7.

The device also includes a set of two tubes, namely a main tube 10 and a second tube 11 establishing communication between three tanks, namely a low tank 12 used to detect large leaks positioned at the level of the bottom of the filling column 5, a top tank 13 placed at the high level of the filling column 5 above the float compartment 7, and an intermediate tank 14. The high tank 13 and the intermediate tank 14 are used to regulate the hydraulic flows.

To be more precise, the high tank 13 is provided, with a high bell 15 in which terminate the ends of the two communication tubes 10 and 11. Said high tank 13 is fed with water by means of an opening 16 provided in the filling column 5.

According to the invention one communication tube, namely the main tube 10, provided at its low end with a low bell 17 positioned in the low tank 12, establishes communication between said low tank 12 and the high tank 13.

The low tank 12 is provided in its lower portion with a calibrated flow orifice 18 enabling slow and controlled flow of water when the main cistern 4 is empty.

In a first variant of the device shown in FIG. 1 the device comprises a dedicated pipe 21 provided with a flow orifice 19 leading to the flushing main cistern 4. Said flow orifice 19 is provided with a secondary valve 20 and enables flow of water from the ballast tank 8 when the latter is ready to be emptied.

In this first variant the flow of water from the ballast tank 8 is effected outside the float compartment 7 via said dedicated pipe 21.

Still in this variant, the intermediate tank 14 is fastened to the float compartment 7 and adapted to feed it with water to fill it.

Figure 2:
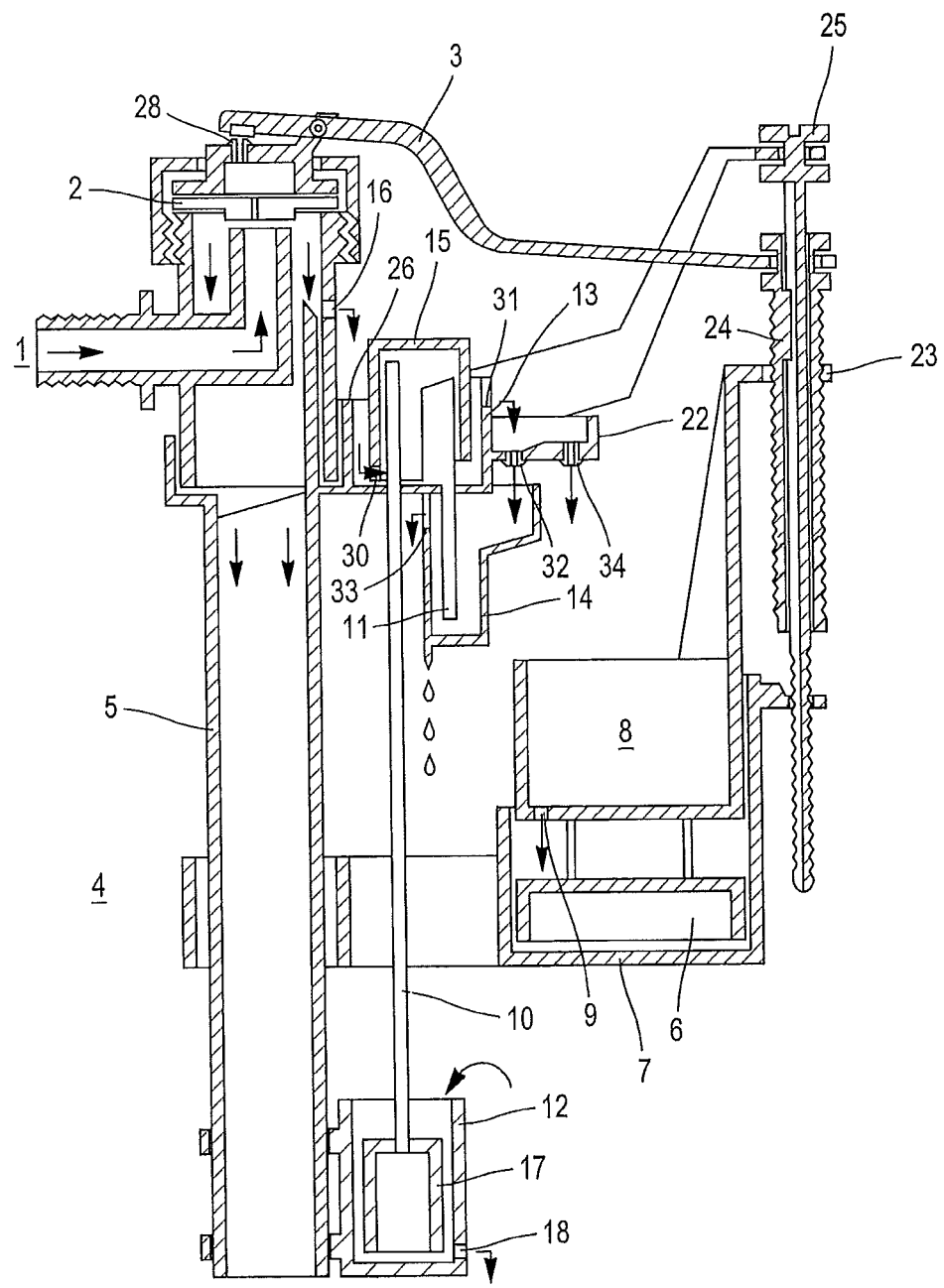
FIG. 2 is a sectional view of the device for detecting leaks and shutting off the water inlet in a second embodiment.

In a second variant of the invention shown in FIG. 2 the float compartment 7 receives water from the ballast tank 8 when the latter is ready to be emptied.

In this second variant the intermediate tank 14 is fastened to the high tank 13 and fed with water by the latter by means of an overflow tank 22.

As shown in FIGS. 1 to 4, the float 6 is firmly fastened to a part 23 that is able to slide along a vertical guide. An adjustment screw 25 enables adjustment of the height over which the float 6 moves simultaneously with the float compartment 7 by vertical movement of the part 23 relative to its support part 24.

In any of these four variants of the device, resetting following a small or large leak is effected by simple action on the operating lever 3 or on an actuating mechanism 47, 49. The effect of such action is to lower the float 6 in the float compartment 7, this lowering of the float 6 opening the water inlet 1 into the flushing main cistern 4.

The operation of the first variant of the device is described in more detail nest with reference to FIG. 1:

When the cistern is first filled with water, the water level rises in the main cistern 4, the water flowing via the filling column 5 and through the opening 16. The water arriving via said opening 16 fills the high tank 13. The two tubes 10 and 11 are filled with air and at atmospheric pressure. The level in the high tank 13 and in the high bell 15 is maintained constant thanks to the overflow 26. When the water level rises in the twain cistern 4 water fills the low tank 12 and floods the low bell 17. Air pushed along the main tube 10 arrives in the high bell 15 and is evacuated via the second tube 11. As it continues to rise in the main cistern 4, the water reaches the level of the secondary valve 20, which then shuts off the flow orifice 19, and then overflows into the float compartment 7 on passing over the rim 27. The float compartment 7 fills, together with the ballast tank 8, causing the float 6 to rise and the part 23 and the support part 24 to slide along the vertical guide. The intermediate tank 14 also fills. When the high level is reached the tilting of the operating lever 3 applies pressure to the inflow orifice 28 which actuates the main valve 2 in the direction that shuts off the water inlet 1.

On flushing, when the level in the main cistern 4 falls, the secondary valve 20 is released and water is rapidly evacuated from the upper portion of the float compartment 7 via the flow orifice 19. On the other hand, the water contained in the ballast tank 8 does not have time to be evacuated via the calibrated flow orifice 9 and the ballast causes the float 6 to descend in the float compartment 7. The water in the float compartment 7 passes over the rim 29 and is evacuated via the flow orifice 19. The float 6 then remains in the high position despite the slow draining of the ballast tank 8. When water rises in the main cistern 4 the secondary valve 20 is closed again. Water then fills the float compartment 7 and causes said float 6 to rise, which triggers the shutting off of the water inlet 1, and a new cycle can begin.

In the event of a small leak at its outlet, the water level in the main cistern 4 falls slowly, leading to a drop in the level around the ballast tank 8 and evacuation of water via the flow orifice 19. The water in the ballast tank 8 then has lime to be evacuated via the calibrated flow orifice 9 while the float compartment 7 remain full, which enables the float 6 to be retained in the high position and prevents water into the main cistern 4, the latter gradually emptying. For resetting it suffices to depress the operating lever 3 to cause the float 6 to descend in its compartment, which leads to overflowing of the water contained, in the float compartment 7 and opening of the water inlet 1.

In the event of a large leak, the main cistern 4 remains empty and water flows continuously. The water contained in the low tank 12 is gradually evacuated via the calibrated flow orifice 18 until the low tank 12 is completely emptied. When the water reaches the height of the low bell 17 the water level, in the high bell 15 rises as the level fells in the low tank 12, the effect of which is to bring the water level, in the high bell 15 to the level of the mouth of the second tube 11. This enables the water to overflow into the intermediate tank 14. The water then overflows into the float compartment 7 with which it communicates. The effect of this is to cause the float 6 to rise and actuate the operating lever 3 to shut off the water inlet 1. Resetting is effected in the same manner as in the ease of a small leak by depressing the operating lever 3.

The operation of the second variant of the invention is different and is explained hereinafter with reference to FIG. 2:

When the cistern is first filled with water the water level rises in the main cistern 4, the water flowing via the filing column 5 and through the opening 16. The water arriving via said opening 36 fills the high tank 13, after which the level remains constant at the height of the overflow 26. Water then flows through the calibrated passage 30 into the high bell 15. The water overflows into the overflow tank 22, passing over the overflow 31, which enables a constant level to be maintained in the high bell 15. Water flows from the overflow tank 22 via the orifice 32 to fill the intermediate tank 14, immersing the second tube 11.

The overflow 33 maintains a stable level in the intermediate tank 14. At the same time, water also flows through the orifice 34 to fill the ballast tank 8 placed above the float 6. Water that escapes via the calibrated flow orifice 9 then begins to fill the float compartment 7. On rising in the main cistern 4, the water completely floods the low tank 12 and expels the air from the low bell 17 via the main tube 10 into the high bell 15. The effect of this is to cause the water level therein to fall and to evacuate some of the air at its base. When the water level in the main cistern 4 continues to increase the float compartment 7 is, after which the ballast tank 8 is partially immersed, the effect, of which is to cause the float 6 to rise and to shut off the water inlet 1 by the same procedure as for the first variant.

On flushing, when the level in the main cistern 4 fells, the ballast in the ballast tank 8 causes the float 6 to descend, which in turn causes the operating lever 3 to descend, opening the water inlet 1. During inflow, water coming from the overflow tank 22 feeds the ballast tank 8 to maintain the float 6 in the low position until the water level in the main cistern 4 reaches the filling level of the float compartment 7, and then of the ballast tank 8. Filling then causes the float 6 to rise and shuts off the water inlet.

In the event of a small leak in the main cistern 4, the water level falls slowly, leaving the necessary time for the water in the ballast tank 8 to flow through the calibrated flow orifice 9. The ballast tank 8 is then no longer able to cause the float 6 to descend, which locks the water inlet 1 even if the main cistern 4 is emptied. To reset the device it suffices to depress the operating lever 3. The effect, of this is to force the float 6 to descend, which causes the water inlet 1 to be opened. The inflowing water fills the ballast tank 8 via the overflow tank 22 and maintains the float 6 in the low position tor normal filling of the main cistern 4.

In the event of a large leak the main cistern 4 remains empty and the water in the low tank 12 is gradually evacuated via the calibrated flow orifice 18. When the water level reaches the level of the low bell 17 the water level in the high bell 15 rises gradually descends in the low bell 17. The effect of this is to bring the water level in the high bell 15 above the overflow 31 and to the level of the mouth of the second tube 11 in which the water finally flows to the intermediate tank 14. The overflow tank 22 no longer being fed, it follows that the ballast tank S is progressively emptied, leading to the float 6 rising and therefore shutting of off the water inlet 1. Resetting is effected in the same manner as in the event of a small leak by depressing the operating lever 3.

Figure 3:
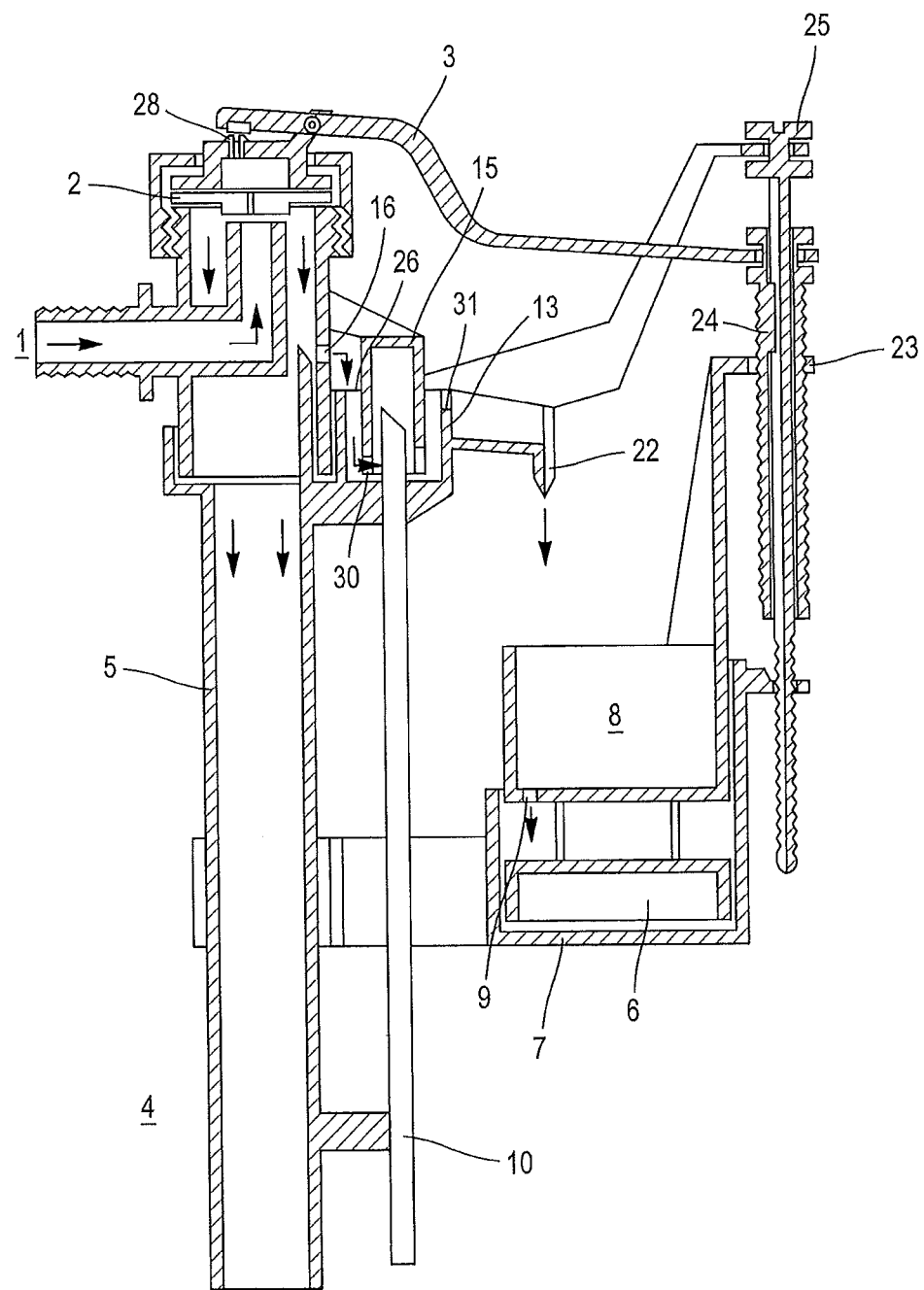
FIG. 3 is a sectional view of the device for detecting leaks and shutting off the water inlet in a third embodiment.

The operation of the third variant of the invention is explained hereinafter with reference to FIG. 3.

When the cistern is first filled with water, the water level rises in the main cistern 4, the water flowing via the filling column 5. The water that arrives via the opening 16 fills the high tank 13. The level remains constant at the height of the overflow 26. The water then flows through the calibrated passage 30 into the high bell 15 and then flows through the main tube 10. On rising in the main cistern 4 the water level blocks the main tube 10 at the bottom, gradually creating an air pressure in the high bell 15 lowering the water level therein below the mouth of the main tube 10. Water then flows over the overflow 31 and then the manifold 22 to fill the ballast tank 8 positioned above the float 6. The water that escapes via the calibrated flow orifice 9 then begins to fill the float compartment 7. As the water level in the main cistern 4 continues to rise, the float compartment 7 is immersed, after which the ballast tank 8 is partially immersed, the effect of which is to cause the float 6 to rise and to shut off the water inlet 1 by the same procedure as for the second variant. The water level in the ballast tank 8 then tails to the same level as the level of the flushing main cistern 4. This enables a sufficient pressure to be maintained at the inflow orifice 28 in the event of a variation in pressure in the water main.

On flushing, when the level in the main cistern 4 falls, the ballast in the ballast tank 8 causes the float 6 to descend, which in turn causes the operating lever 3 to descend, opening the water inlet 1. During inflow, water coming from the manifold 22 feeds the ballast tank 8 with water to hold the float 6 in the low position until the water level in the main cistern 4 reaches the filling level of the float compartment 7 and then of the ballast tank 8. Filling then causes the float 6 to rise shuts off the water inlet.

In the event of a small leak in the main cistern 4, the water level falls slowly, which leaves the necessary time for the water in the ballast tank 8 to flow through the calibrated flow orifice 9. The ballast tank 8 is then no longer able to cause the float 6 to descend, which maintains the locking of the water inlet 1 even if the main cistern 4 is emptied.

In the event of a large leak the main cistern 4 remains empty and the main tube 10 is at atmospheric pressure, the effect of which is to bring the water level in the high bell 15 to the level of the mouth of the main tube 10 in which water finally flows to the main cistern 4. Water no longer passing over the overflow 31, it follows that the ballast tank 8 is gradually emptied, leading to the float 6 rising and therefore shutting off of the water inlet 1. Resetting is effected in the same manner as in the event of a small leak by depressing the operating lever 3.

The operation of the fourth, variant, of the invention is explained hereinafter with reference to FIG. 4.

When the cistern is first filled with water, the water level rises in the main cistern 4, water flowing through the filling column 5. The water that arrives via the inflow orifice 28 fills the high tank 13. Water then flows through the opening 30 into the annular bell 15, and then passes over the siphon 48 into the central compartment 50. From there it flows via the central tube 51 and feeds the float compartment 7. The rising water level in the main cistern 4 blocks the main tube 10 at its base by gradually creating air pressure in the annular bell 15. The effect of this is to lower the water level therein below the siphon 48, the float compartment 7 no longer being fed with water, which is evacuated over the overflow 26. As the water level in the main cistern 4 continues to rise the float compartment 7 is immersed, the effect of which is to cause the float 6 to rise and to shut off the water inlet 1 by the same procedure as for the first variant. At the same time the operating float 52 ascends and abuts against, the actuating lever 39. The float 6 is designed, to maintain sufficient pressure on the inlet orifice 28 in the event of variation of the pressure in the water main.

On flushing, when the level in the main cistern 4 falls, depressing the operating button 53 lowers the maneuvering float 52 via the operating mechanism 49, which causes the float 6 to descend when released. The latter intern causes the operating lever 3 to descend, which opens the water inlet 1. During inflow, the float 6 remains in the low position until the water level in the main cistern 4 reaches the filling level of the float compartment 7. This causes the float 6 to rise and shuts off the water inlet.

In the event of a small leak in the main cistern 4, as the mechanism 49 has not been actuated, the float compartment 7 is not emptied. The float 6 thus remains in the high position, which maintains the locking of the water inlet 1 even if the main cistern 4 is emptied.

For resetting it suffices to depress the operating button 53 actuating the actuating mechanism 49 which lowers the maneuvering float 52 in the float compartment 7. This creates an overflow and then a drop in level when the operating button 53 is released and the maneuvering float 52 rises, and therefore causes the float 6 to descend in the float compartment 7 and opening of the water inlet 1.

In the event of a large leak the main cistern 4 remains empty and the main tube 10 is at atmospheric pressure, the effect of which is to bring the water level in the annular bell 15 to the level of the siphon 48 in which the water finally flows to the float compartment 7. This leads to the float 6 rising and thus to shutting off of the water inlet 1. Resetting is effected in the same way as in the event of a small leak by actuating the operating button 53.

The combination of actuating mechanisms 49 creating an overflow for opening the water inlet 1 on flushing or for resetting following a leak and the operating principle of the detection and failsafe device for a large leak (FIG. 1) enables the ballast tank 8 to be dispensed with; such a feature enables calibrated orifices to be dispensed with, thereby improving the reliability of the device. The embodiment represented in FIG. 4 explains this operating principle.

The same result can be obtained by eliminating the ballast tank 8 of the FIG. 1 device and the upper portion of the float compartment 7 with its dedicated pipe 21 and the secondary valve 20.

Figure 4:
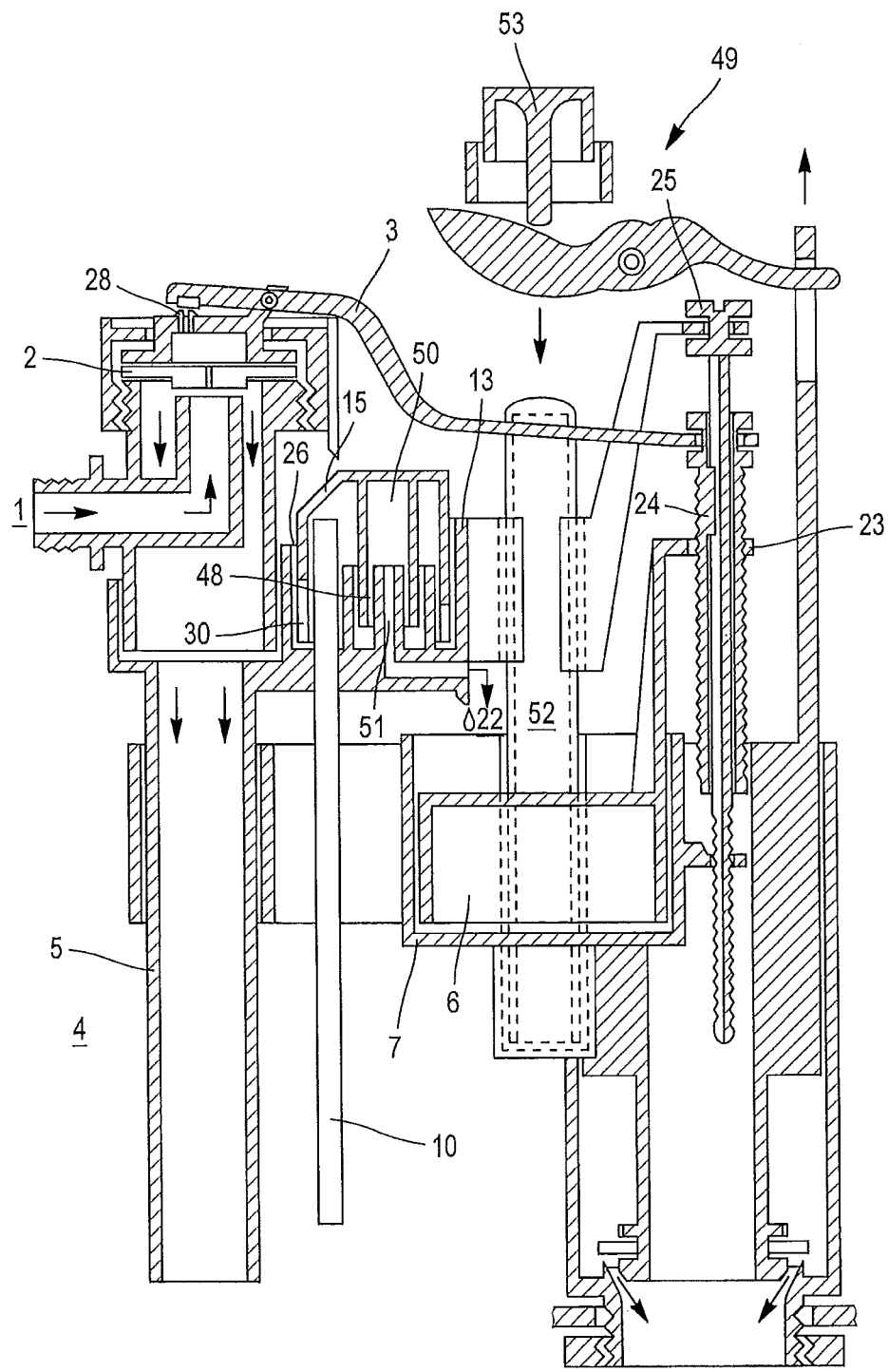
FIG. 4 is a sectional view of the device for detecting leaks and shutting off the water inlet in a fourth embodiment.

The solutions for detecting and dealing with large leaks and small leaks may be combined differently between the variants 1, 2, 3 and 4, for example by producing the tubes 10, 11, the tanks 12, 13, 14 and the bells 15, 17 according to FIG. 1 and the float compartment 7 and the float 6 according to FIG. 4 or, conversely, the main tube 10, the high tank 13 and the high bell 15 according to FIG. 4 with a float compartment 7 and a float 6 according to FIG. 1.

For each of the four variants of FIGS. 1, 2, 3 and 4 there may also be produced a variant without the tube or tubes 10, 11, the tanks 12, 13, 14 and the bells 15, 17; the resulting variant then enables detection of small leaks and shutting off the water inlet 1 in the event of a small leak but cannot alleviate large leaks. These variants do not depart from the scope of the present invention. Such variants may where appropriate utilize a different solution for large leaks.

There may also be produced for each of these variants a variant comprising the tubes 10, 11, the tanks 12, 13, 14 and the bells 15, 17, but comprising a float, compartment different from the solution conforming to the invention. Small leaks are detected otherwise, or are not detected, but large leaks are then detected and treated in accordance with the invention.

A number of possible variants of the device concern the resetting mechanism 47. This may be coupled to the operating lever 3 of the cistern or be constituted of an additional button. Resetting may also be independent of flushing, for example using a groove crossing the orifice of the main cistern 4 in line with the feed connection or via a second channel molded in the latter and provided for this purpose enabling different modes of actuation. For example, this maybe a mode of actuation that is mechanical, using a cable in a sheath, or pneumatic, using a bellows, or electromechanical, or otherwise.

Figures 5, 6:
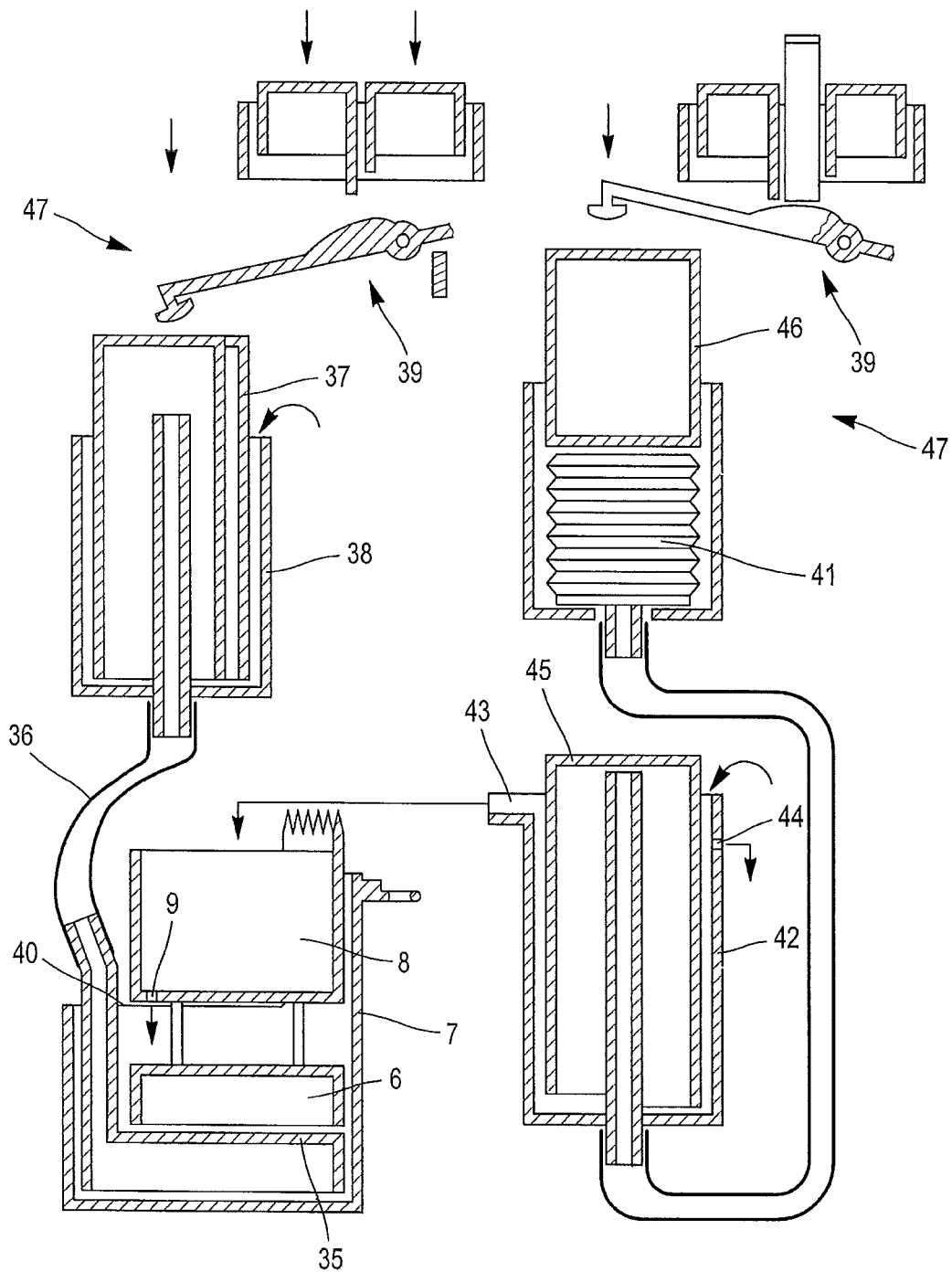
FIG. 5 shows a first variant of a system for resetting the device after a small or large leak.
FIG. 6 shows a resetting system conforming to a second variant.

Two more particularly interesting variants of the resetting mechanism 47 are described here with reference to FIGS. 5 and 6.

With reference to variant 2 of the invention, FIG. 5 shows a float compartment 7 including a float 6, a ballast tank 8 and a bell 35 positioned under the float 6. Said bell 35 is connected by a pipe 36 to the interior of a piston 37 disposed in a cylinder 38. Said piston 37 is associated with a lever 39 enabling the user of the flushing cistern to tower the piston 37 for resetting.

When, the main cistern 4 is filled with water, the cylinder 38 is fed with water coming from the inlet, for example from the overflow 26. The cylinder 38 is then gradually filled, raising the piston 37 by virtue of its internal float, the piston 37 coming to abut against the lever 39. When the inflowing water floods the float compartment 7 and the ballast tank 8, the air in the bell 35 is replaced by water and expelled via the pipe 36 toward, the piston 37, reducing the water level in the latter. In the event of a small or large leak the ballast tank 8 is empty and in the high position and the float compartment 7 is filled with water up to the rim 40. By depressing the piston 37 by means of the actuator lever 39 the air in the piston 37 is compressed and then transferred to the bell 35, taking the place of the water therein, which is evacuated over the rim 40. When the lever 39 is released the piston 37 rises, rebalancing the pressure, the water in the float compartment 7 fills the bell 35 again, causing the level to fall and the float 6 to descend, the effect of which is to open the water inlet 1 and start another filling cycle. The piston 37 and its cylinder 38 may be replaced with the bellows 41 from FIG. 6.

In a second resetting variant shown in FIG. 6 the piston 37 is replaced by a bellows 41 and a cylinder 46. The bellows 41 is connected by a pipe to a vessel 42 filled with the inflowing water when filling the main cistern 4, which vessel includes internally a bell 45. Said vessel further includes a pouring spout 43 and a flow orifice 44. The latter is calibrated to evacuate just the water top-up flow enabling the level in the vessel to be maintained below that of the pouring spout 43.

A first resetting maneuver is necessary at the time of the first filling with water to arm the device. Via the lever 39 the cylinder 46 then compresses the bellows 41, expelling the air via the connecting pipe to the bell 45. The air is then evacuated at the base of the latter, and water takes it place when the resetting button is released.

When the actuating lever 39 is operated for resetting the cylinder 46 is lowered, expelling air from the bellows 41 to the bell 45. This air expels the water under the bell 45 and causes its evacuation via the pouring spout 43. Said pooling spout 43 is positioned above the ballast tank 8 so as to receive this overflow water. Filling the ballast tank 8 consequently causes the float 6 to descend and the water inlet 1 into the main cistern 4 to open.

The resetting mechanisms 47 shown in FIGS. 5 and 6 are also used as actuating mechanisms 49.

Of course, the mention is not limited to the embodiments described and represented by way of example, but also comprises all technical equivalents and their combinations.

1. Water inlet
2. Main valve
3. Operating lever
4. Main cistern
5. Filling column
6. Float
7. Float compartment
8. Ballast tank
9. Calibrated flow orifice
10. Main tube
11. Second tube
12. High tank
13. Low tank
14. Intermediate tank
15. High bell, annular bell
16. Opening
17. Low bell
18. Calibrated flow orifice
19. Flow orifice
20. Secondary valve
21. Dedicated pipe
22. Overflow tank
23. Pan
24. Support part
25. Adjustment screw
26. Overflow
27. Rim
28. Inlet orifice
29. Rim
30. Opening
31. Overflow
32. Orifice
33. Overflow
34. Orifice
35. Bell
36. Pipe
37. Piston
38. Tank
39. Lever, actuating lever
40. Rim
41. Bellows
42. Tank
43. Pouring spout
44. Flow orifice
45. Bell
46. Cylinder
47. Resetting or actuating mechanism
48. Siphon
49. Actuating mechanism
50. Central compartment
51. Central tube
52. Maneuvering float
53. Operating button

I claim:

1. An apparatus for detecting leaks and for shutting off a water flow, the apparatus comprising:
    a flushing cistern having a water inlet that is controlled by a main valve, said main valve having an operating lever that is operable to close said main valve;
    a filling column connected to said flushing cistern, said main valve cooperative with said filling column so as to supply said flushing cistern;
    a float compartment having a float in said float compartmnet, said float cooperative with said operating lever so as to pivot said operating lever when said flushing cistern is full of water, said float compartment being closed at a bottom part and over an entire lateral periphery of said float compartment;
    an actuating mechanism cooperative with said operating lever of said main valves;
    an elevated tank positioned above said float compartment;
    an elevated bell disposed in said elevated tank; and a main tube communicating with said bell, said main tube extending downwardly from said elevated tank so as to have a lower end at a level adjacent to a level of a bottom of said flushing cistern, said elevated tank and said elevated bell and said main tube adapted such that a lowering of a level of water in said main tube causes a rise in a level of water in said elevated bell and to cause said float to rise.

2. The apparatus of claim 1, further comprising:

another tube having an end terminating in said elevated bell, said main tube having an end terminating in said elevated bell, said elevated tank being fed with water by an opening in said filling column.

3. The apparatus of claim 1, further comprising:

a lower tank having a calibrated flow orifice; and a lower bell communicating with said lower end of said main tube, said lower bell disposed in said lower tank.

4. The apparatus of claim 1, further comprising:

an intermediate tank connected to said elevated tank such that said elevated tank can feed water to said intermediate tank by way of an overflow tank.

5. An apparatus for detecting leaks and for shutting off a water flow, the apparatus comprising:

a flushing cistern having a water inlet that is controlled by a main valve, said main valve having an operating lever that is operable to close said main valve;

a filling column connected to said flushing cistern, said main valve cooperative with said filling column so as to supply said flushing cistern;

a float compartment having a float in said float compartment, said float cooperative with said operating lever so as to pivot said operating lever when said flushing cistern is full of water, said float compartment being closed at a bottom part and over an entire lateral periphery of said float compartment;

an actuating mechanism cooperative with said operating lever of said main valve; and a ballast tank positioned above said float compartment so as to cause lowering of said float when said flushing cistern is flushed.

* * * * *